United States Patent [19]

Hirsch et al.

[11] Patent Number: 4,802,570

[45] Date of Patent: Feb. 7, 1989

[54] STACKER WITH A YOKE-TYPE STRIPPING DEVICE

[75] Inventors: John L. Hirsch, Sheboygan Falls; Mark L. Wingender, Sheboygan, both of Wis.

[73] Assignee: Curt G. Joa, Inc., Sheboygan Falls, Wis.

[21] Appl. No.: 95,839

[22] Filed: Sep. 14, 1987

[51] Int. Cl.$^4$ .............................................. B65G 61/00
[52] U.S. Cl. ..................................... 414/790; 198/430; 198/463.3; 198/468.9; 414/785; 414/790.3; 414/793.5; 414/79
[58] Field of Search ................... 198/422, 468.11, 426, 198/429, 430, 463.2, 463.3, 468.9; 414/46, 77, 78, 45, 79, 785; 53/540; 271/218

[56] References Cited

U.S. PATENT DOCUMENTS

| | | | |
|---|---|---|---|
| 3,122,240 | 2/1964 | Steels | 414/79 X |
| 3,429,466 | 2/1969 | Puderbach | 414/79 X |
| 4,325,475 | 4/1982 | Spalding | 198/422 X |
| 4,399,905 | 8/1983 | Lance et al. | 198/422 |
| 4,618,055 | 10/1986 | Porcelli | 414/46 X |

*Primary Examiner*—Frank E. Werner
*Assistant Examiner*—Lyle Kimms
*Attorney, Agent, or Firm*—Fuller, Puerner & Hohenfeldt

[57] ABSTRACT

A yoke-type stripper for an article stacker in which a series of paddles extending horizontally from vertically moving conveyor chains each carries an article that becomes a member of the stack. The stripper has rear and front rows of laterally spaced apart vertical bars. Carrier bars extending horizontally from vertical bars in the rear row constitute the bottom of the yoke. The paddles have fingers which support the articles and which pass downwardly between the bars to let the bottom article in the stack rest on the top edges of the carrier bars. A shuttle table is located adjacent the yoke and the table has slots into which the yoke bars can shift. The carrier bars are at a higher level than the table top when the stack is accumulating. Fluid work cylinders shift the yoke and the stack therein to the table slots while the carrier bars are kept at said higher level clear of the table so the pads are not dragged. One cylinder is actuated to lower the yoke in the table slots sufficiently for the top edges of the carrier bars to become flush with the table top. The yoke is then caused to dwell while the stack is pushed out.

6 Claims, 2 Drawing Sheets

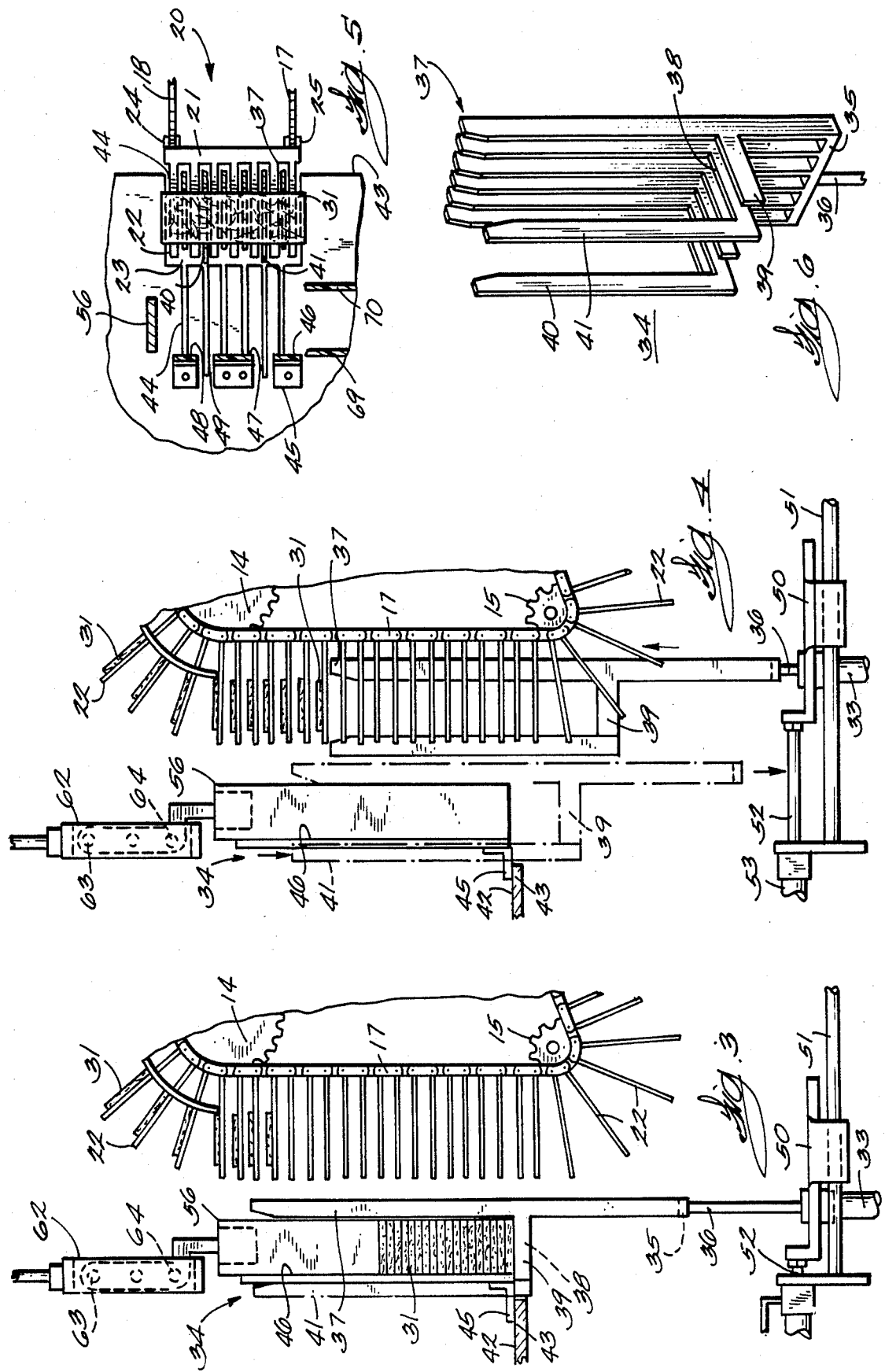

STACKER WITH A YOKE-TYPE STRIPPING DEVICE

BACKGROUND OF THE INVENTION

The invention disclosed herein pertains to a machine for stacking articles. In particular, the invention resides in an improved device for stripping a stack of articles from the stacking machine so the stack can be forwarded to a packaging machine, for example. The new stripping device is especially efficacious in stripping stacks of pliant or supple articles such as sanitary pads and pads having almost gossamer delicacy which are inclined to bunch up and deform when they are handled.

The new stripper solves the problem of stack instability and deformation that occurs in conventional stackers when a stack is being stripped from the stacker machine to where the stack can be conveyed to the next work station, such as to a packaging machine. The new stripper will be demonstrated in connection with stacking feminine sanitary pads.

A widely used conventional stacker has parallel conveyor chains usually running on sets of three pairs of sprockets whose horizontal rotational axes are parallel and arranged at the corners of a triangle. A series of rows of paddles or fingers are fastened to the conveyor chains and the paddles extend outwardly from the chains. At one place, where the paddle carrying chains pass over a sprocket, the paddles fan out to provide space between them for feeding pads from a flat belt conveyor into the space between consecutive paddles. This is usually done adjacent a sprocket at one of the lower corners of the triangle. Paddles then carry the pads upwardly and when the conveyor chains turn around the uppermost sprockets, the articles transfer from a trailing paddle in a pair to a leading paddle so the pads invert as they begin to descend. After that, the paddles, which are now descending with the conveyor chains, extend out horizontally away from the chains, one above the other, so that a pad on each of the paddle groups contribute to forming a stack of pads or other articles which are resting on the paddles and are spaced apart vertically by the distance between each two consecutive sets of paddles. The paddles are comprised of individual paddle elements or fingers which are laterally spaced from each other. In prior art apparatus, the lowermost pad in an accumulated stack is settled on the upper surface of a platform in a stripper device. The platform has slots to allow the conveyed paddles or fingers to pass downwardly through the platform and to continue circulation on the conveyor chain loop after the lowermost pad has been left behind on the slotted platform. Stripper bars extend vertically adjacent the pads while the pads are still on the paddles. The vertical length of the stripper bars is equal to the sum of the distances between the horizontally extending paddles on each of which is a pad that will be stripped from the paddles to form a stack. The horizontal platform and vertical stripper bars are shifted laterally when a stack containing a predetermined number of articles has accumulated. The stripper bars move between the laterally spaced apart fingers of the paddles at each level so the bars push the pads in unison to one side so as to strip them off of the paddles. The stack is pushed beyond the outer tips of the paddles onto a shuttle table in line with a shuttle that executes reciprocal motion to push the stack from the table to which it was transferred to a conveyor belt which feeds the stacks to a packaging machine, for example.

In the conventional stacker just outlined, the lowermost pad in the stack is deposited on the slotted platform underneath and in vertical alignment with all of the pads still resting on the paddles above it. The top of the platform is at the same level as the top of the shuttle table so the lowermost pad is dragged along the plane surface by the stripper bars. When all of the pads are pushed clear of the outer tips of the fingers of the vertically spaced apart horizontally extending paddles, every pad in the stack falls vertically through a distance equal to its elevation in the stack minus the sum of the thicknesses of the pads beneath it. The result in conventional strippers is that the articles in a stack are sometimes vertically misaligned and out of balance which has caused problems at the input of the packaging machine. Misalignment results to a large extent from the lowermost pad being dragged along the surface of the stripper platform and the shuttle table which also causes undesirable deformation and scuffing of the pads or other delicate articles which are undergoing stacking.

SUMMARY OF THE INVENTION

In accordance with the invention, a yoke-type stripper device is provided. The device comprises two laterally spaced apart rows of stripper bars extending upwardly from the stripper platform or pad carrier. The two rows of vertical bars and spaced apart horizontal bars constituting the platform comprise the yoke. The spaced apart bars on each side of the yoke allow the conveyor paddles and the pads or other articles carried on them to descend between the vertical stripper bars and also between the bars that form the carrier platform. Thus, the pads or other delicate articles are accumulated in a stack above the carrier platform between the two rows of vertically extending stripper bars. The shuttle table next to the stripper has slots through which both rows of vertically extending stripper bars and the aligned bars of the carrier platform can move horizontally so the stacks of pads can be pushed from between the rows of bars by a horizontally reciprocating shuttle. While a stack of pads is accumulating vertically above the lowermost pad which has reached and is resting on the top surface of the carrier bars, the top edges of the horizontal bars comprising the carrier platform is held at a higher level than the top surface of the shuttle table. Hence, in accordance with the invention, when the stripper is shifted to push the pads from the paddles, the stack is carried by the carrier platform bars rather than being dragged across the shuttle table surface. When the stripper bars have shifted beyond the outer ends of the paddles and the stack of pads is aligned with the shuttle pusher, the whole yoke platform is caused to descend a short distance so as to let the stack settle down onto the top of the shuttle table while the stack is still standing between the two spaced apart rows of vertical stripper bars. At this time, according to the invention, the top edges of the horizontal bars of the carrier are held flush with the top of the shuttle table. The shuttle table has parallel bars defining slots between them and the parallel horizontal carrier platform bars slide into the slots to arrange the stack in alignment with the shuttle pusher. Thus, according to the invention, when the platform of the yoke is lowered so the top surface of the carrier platform bars are flush with the top surface of the shuttle table, the stack is pushed along the shuttle table while there is, in effect, a smooth surface under the lowermost pad in the stack. The surface is smooth because the top edges of the platform bars are flush with the top surface of the shuttle table.

After the shuttle pusher plate has pushed the stack away, the stripper is caused to descend a substantial distance and it then shifts horizontally back into alignment with the paddles and finally upwardly to home position again so as to present the parallel rows of vertical stripper bars between the paddles. Meanwhile, additional articles have been descending on the paddles and a new stack is accumulated shortly after the strippers get back into home position. The operating cycle is then repeated.

A detailed description of an embodiment of the new stripper will now be set forth in reference to the drawings.

DESCRIPTION OF THE DRAWINGS

FIG. 3 illustrates the phase in the operating cycle of the stripper where the stack of pads has been stripped from the conveyor paddles and the horizontal bars of the carrier platform are interdigitated with the slots in the shuttle table but carrier bars are not lowered yet to where they will be flush with the shuttle table slots;

FIG. 4 shows in phantom lines the stripper yoke after a stack has been pushed away by the shuttle pusher and the stripper is shown in solid lines in a condition wherein it is moving vertically upwardly to its maximum height as depicted in FIG. 1 so as to be in the position to stabilize the next stack of articles to be accumulated;

FIG. 5 is a transverse section taken along the plane corresponding to 5—5 in FIG. 1; and FIG. 6 is a perspective view of the stripper yoke isolated from the stacking machine.

DESCRIPTION OF A PREFERRED EMBODIMENT

Figure 1:
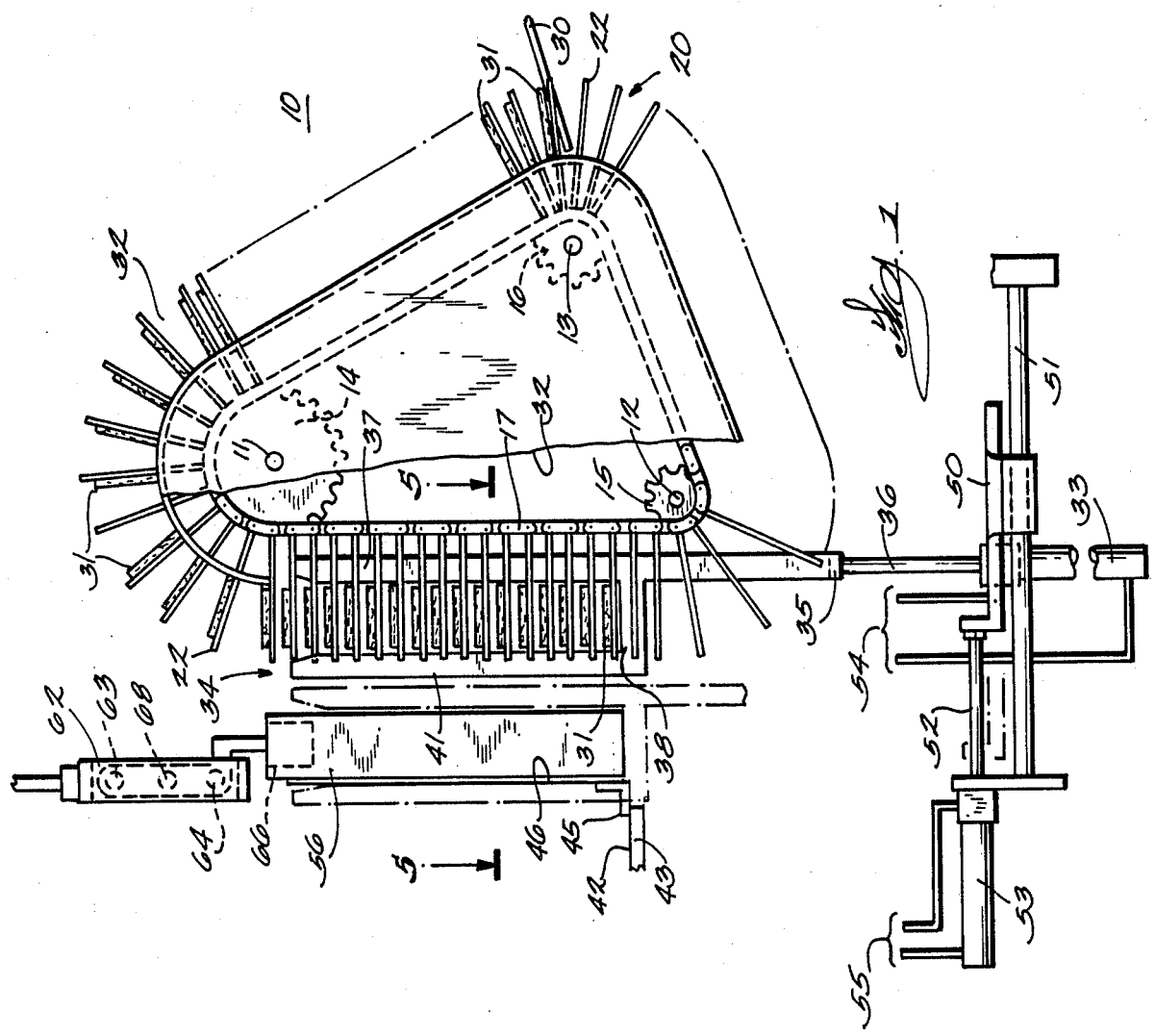
FIG. 1 is a side elevational view of the principal part of an article stacker with which the new stripper device has been affiliated.

The drawings show only those components of a conventional stacker which are necessary to facilitate explaining how the new article stripper cooperates with the stacker and how the stripper cooperates with the adjacent shuttle pusher. Referring to FIG. 1, the stacker is designated generally by the reference numeral 10. The stacker comprises an upper horizontal shaft 11 and two lower horizontal shafts 12 and 13. All shafts are journaled for rotation by means which are not shown and are parallel to each other. The upper shaft 11 has two large sprockets mounted on it, one of which, 14, is visible in FIG. 1 and the other is at a distance behind it. Lower shaft 12 has a sprocket 15 which is visible in FIG. 1 and there is another sprocket on shaft 12 behind it. Shaft 13 has a sprocket 16 and another sprocket behind it which is not visible in FIG. 1. At least one of these shafts is driven rotationally. There are two conveyor chains such as the one marked 17 in FIG. 1 running on the three sprockets. A similar conveyor chain 18, shown in FIG. 5, runs on the other sprockets on the shafts in parallelism with conveyor chain 17. There are a plurality of paddle members 20 connected to the conveyor chains 17 and 18. The paddle members 20 are equally spaced apart along the length of the closed loop conveyor chains 17 and 18. In FIG. 5, one may see that the paddle members 20 are comprised of a cross bar or slat 21 which has thin fingers such as the one marked 22 extending from it. In this example, the paddle members have seven fingers with equal spaces 23 between them. Each paddle member 20 is connected to the chains 17 and 18 with clips 24 and 25 in a well-known manner.

Referring to FIG. 1, as the conveyor chains pass around the sprockets, such as sprocket 16, the fingers 22 of the paddle members 20 fan out so that the space between paddles in the series is greater than the space between them when they are translating along with the conveyor chains through a straight portion of their run rather than around sprockets. A conveyor belt 30, a fragment of which is shown in FIG. 1 near sprocket 16, transports the articles to be stacked, such as pad 31 to a point where they can be picked up on paddles and carried upwardly by the conveyor chains. At the top region 32 of the conveyor, the pads or other articles being stacked get flipped from the top side of a trailing paddle to the bottom side of a leading paddle so that the pads become inverted as they begin their descent on paddles which become horizontal when they are on the substantially vertical part of the conveyor chain 17 as is the case on the left side of the conveyor chain runs shown in FIG. 1. As the closed loop conveyor chains continue to translate, a certain number of horizontal paddles, extending to the left in FIG. 1, become congruent with each other as is also the case with the pads that are supported on the spaced apart fingers 22 of the paddle members concealed between guard shrouds such as the one shown fragmentarily in FIG. 1 and marked 32.

The structure of the stacker thus far described is conventional.

When a predetermined number of pads desired in a stack accumulate in a vertical array on horizontally extending paddle member fingers as at the left side of FIG. 1, the pads must be stripped from the fingers rapidly and the stripping device, indicated generally by number 34, must be restored rapidly to its home position in which it is shown in solid lines to be in readiness for stripping the next stack that is in the process of accumulating while the stripper is stripping the articles from the fingers and returning to home position. The stripper is shown isolated from the stacker in FIG. 6 to which attention is now invited. The yoke-type stripper is comprised of a laterally extending member 35 which is supported on the ram or piston rod 36 of a double-acting fluid actuated cylinder 33. Laterally extending member 35 has a rear row of laterally spaced apart stripper bars 37 extending vertically from it. There are article carrier bars, such as the one marked 38, extending horizontally from the rear row of vertical stripper bars 37. Some of the horizontal carrier bars such as 30 terminate in free ends. The ends of other of the carrier bars 38 are joined with a front row of vertical bars, consisting of two vertical bars which in this case are marked 40 and 41. The two stabilizing front bars 40 and 41 are parallel to the row of rear bars 37, consisting of six bars in this example. The horizontally extending carrier bars 38 and 39 are, of course, laterally spaced apart by the same distance by which the vertical bars 37, 40, 41 are spaced apart. The top edges of the bars 38 and 39, are coplanar and collectively form a slotted carrier platform constituting the bottom of the stripper yoke which includes the spaced apart front and rear rows of vertical bars.

In FIG. 1 the yoke is shown in its home position in solid lines. The paddles are moving downward and the lowermost pad in the prospective stack is resting on the platform comprised of horizontal carrier bars 38 and 39. Now that the stack is accumulated, the individual pads or articles that comprise the stack must be stripped off of the fingers 22 of the paddle members 21. The rear and front rows of stripper bars 37 and 40, 41, respectively, are extending upwardly between the laterally spaced apart fingers 22 of the paddle members. Thus, there is no interference for the whole yoke 34 to shift to the left rapidly to position the stack for being deposited on the top surface 42 of a top plate 43 of a shuttle table. As is evident in FIG. 5, table top plate 43 has a large rectangular slot 44 which allows the paddles to pass vertically through the plate 43 without collision. As shown in FIG. 5, the shuttle table plate 43 is provided with several parallel slots 44 which are aligned with the rear row of vertical stripper bars 37 and the front row of vertical stripper bars 40 and 41 which comprise yoke 34 along with horizontal carrier bars 38 and 39. Thus, it is possible for the entire yoke 34 to shift to the left and for the horizontal carrier bars to be shifted within slots 44.

FIG. 1 shows that, prior to any shifting of yoke 34 to the left, the pad 21 at the bottom of the stack is resting on the coplanar top edges of the horizontal carrier bars 38 and 39 and the coplanar top edges of the carrier bars are at a level higher than the top surface 42 of shuttle table top plate 43 at this time. The advantage of this is that, according to the invention, when the yoke 34 is shifted to the left, the rear bars 37 of the yoke push the pads off of the paddle fingers, but the pads stay supported on the carrier bars so there is no drag of the pads on the top surface 42 of the shuttle plate or anywhere else when the yoke is shifted to the left. Of course, as the stack of pads is stripped from the horizontally extending fingers of the paddle members, the pads drop down on each other to form a closed stack. During this time, however, the pads are always captured between the upstanding front and rear rows 40, 41 and 37 of vertical stripper bars. The front bars 40 and 41 have not been used in stripper bar arrangements heretofore. They perform the important function of stabilizing the stack during the stripping operation and preparatory to the stack being pushed out from between the two rows of stripper bars.

As shown in FIGS. 1, 3, 4 and 5 there is a row of three angle members, such as the one marked 45, fastened to the upper surface 42 of shuttle table plate 43 inside of the ends of the horizontal slots 44 in the plate. Vertical guide strips 46, 47 and 48, made of plastic, are fastened to the upstanding legs of the angle members. There are spaces 49 between the edges of the guide bars so when the yoke shifts left to strip the pads, the upright front row of bars 40 and 41 can go far enough to become at least flush with the backs of the vertical guide strips or go beyond the faces in which case the smooth faces keep the edges of the pads aligned. The guide strips 46–48 also contribute to stabilizing the stack as it is being pushed out of the yoke by pusher plate 56 of the shuttle as will be discussed in more detail later.

The manner in which the stripper yoke 34 is actuated will now be discussed. Refer first to FIG. 1 where the stripper is depicted in solid lines in home position. As previously stated, the yoke 34 is supported on the ram or piston rod 36 of a fluid work cylinder 33. This work cylinder is mounted to a carriage 50. Carriage 50 is movable bilaterally on a pair of stationary parallel guide rods one of which, 51, is visible in FIG. 1. The piston rod or ram 52 of a fixedly mounted double acting fluid horizontal cylinder 53 is coupled to carriage 50. In FIG. 1, piston rod 52 of work cylinder 53 is extended to its rightmost limit such that stripper yoke 34 is located in its home position. Vertical piston rod 36 is also extended to its uppermost limit in which case the upper edges of the horizontal carrier bars 38 and 39 of yoke 34 are a short distance above the top surface 42 of shuttle table 43. In a commercial embodiment, by way of example and not limitation, the top edges of the horizontally extending carrier bars 38 are about one inch above the plane top surface 42 of the shuttle table 43.

The controls for the fluid operated cylinders are not shown since those skilled in the art will perceive various ways for cycling the double acting work cylinders 33 and 53 and for causing dwells. In any case, the controls will cause the tubes 54 of cylinder 33 and tubes 55 of cylinder 53 to alternately supply and exhaust pressurized fluid to and from the cylinders.

After a stack of pads has accumulated between the rows of vertical bars 37 and 41 of stripper yoke 34, the horizontal work cylinder actuates its piston rod 52 so carriage 50 moves to the left in FIG. 1 in which case the rear row of vertical stripper bars 37 sweep the pads 21 off the series of horizontally extending paddle fingers and the yoke-type stripper 34 shifts to its leftmost position as exhibited in FIG. 1 in broken lines. The front pair of vertical bars 40 and 41 stabilize the stack of pads when it is being shifted. However, until the stripper 34 reaches its leftmost position, it is held at its uppermost elevation in which it is depicted in phantom lines. Thus, the stack of pads is carried to the left in FIG. 1 on the top edges of carrier bars 38 and 39 which are typically about one inch above the level of the top 42 of shuttle table 43. Double or sequential strokes of cylinder 37 of about one inch and six inches for example, causes the yoke to dwell. In the dwell phase, the top edges of the carrier bars 38 and 39 are flush with the top surface 42 of the shuttle table, a smooth surface is presented to the bottom of the stack. Thus, the pusher plate 56 of the shuttle can be quickly translated in the space between upright front and rear rows of bars 41 and 37 of the stripper yoke 34 so as to push the stack of pads from between the upright bars of the stripper yoke.

FIG. 3 shows carriage 50 contracted to its leftmost limit by horizontal fluid work cylinder 53. After the dwell for allowing the stack to be pushed out of the stripper, cylinder 37 draws the stripper to a lower position in which it is depicted in phantom lines in FIG. 4. At this time the stripper 34 is still in motion downwardly. Next the horizontal cylinder 53 extends so horizontal carriage 50 moves to the right. When the stripper reaches its rightmost limit, vertical work cylinder 37 is pressurized to drive the stripper 34 upwardly until it arrives in its uppermost home position as indicated in solid lines in FIG. 1. Of course, while the stripper 34 is going through a cycle beginning and ending with it being in home position, a series of pads or other articles is continuing to come down on the paddles to form the next stack. When the stack is formed the operating cycle of the stripper is repeated.

Figure 2:
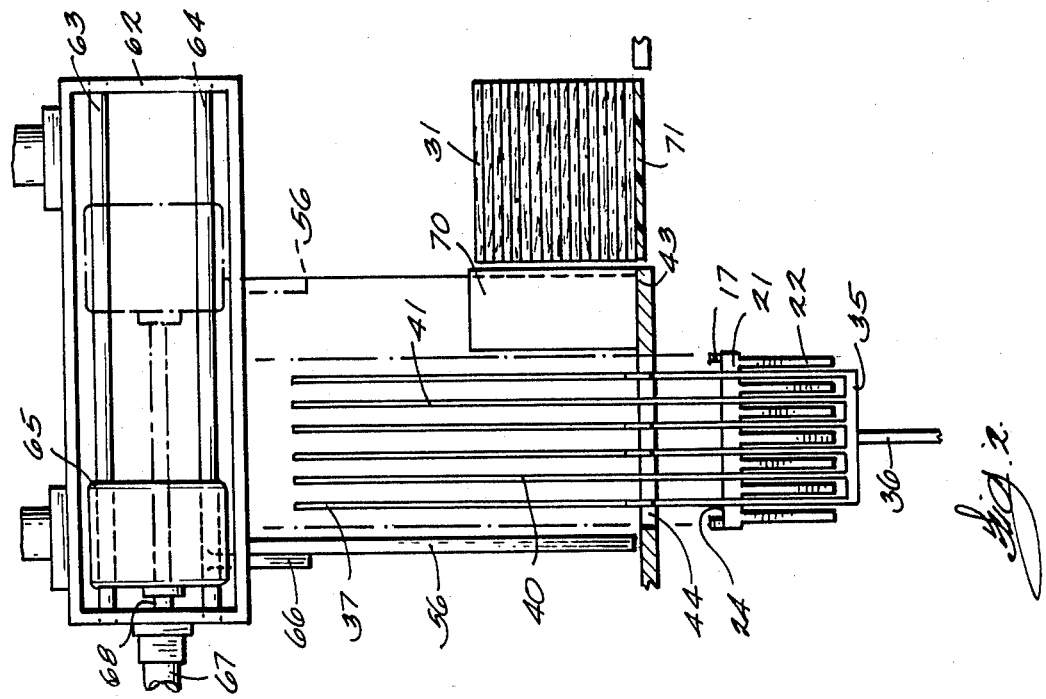
FIG. 2 is a front elevational view of the stacker and the stripper looking at the left side of FIG. 1.

Referring to FIG. 2, the shuttle is substantially conventional in that it comprises a stationarily mounted frame 62 in which a pair of horizontal guide rods 63 and 64 are fixed. A carriage member 65 is mounted for sliding on the guide rods. A tongue 66 extends vertically from carriage member 65. Previously mentioned pusher plate 56 is fastened to tongue 56. A pneumatic work cylinder 67 is fastened to frame 62 as shown in FIG. 2 and the piston rod 68 of this work cylinder is fastened to carriage member 65. At the appropriate time for pushing a stack of pads from between the rows of yoke stripper bars, pneumatic cylinder 67 is activated and its piston rod extends as illustrated in phantom lines in FIG. 2. A substantial amount of time is available for retracting the pusher plate 56 to its parked position wherein it is shown in solid lines in FIG. 2, while further steps in the yoke stripper 34 operating cycle are being executed. In FIG. 2, the pusher plate 56 of the shuttle is shown in phantom lines in its rightmost limit position. The shuttle has pushed the stack through a tunnel comprised of side walls 69 and 70 and is conveyed on conveyor 71 to a packaging machine, not shown.

We claim:

1. A stripper for stripping articles from a conveyor, the conveyor comprising: driven closed loop flexible means driven lengthwise, a series of paddle members disposed along the length of said flexible means, said paddle members having corresponding ends connected to said flexible means and extending outwardly therefrom for articles to be deposited on said paddle members at one location and for a series of articles to be accumulated on said paddle members, respectively, where a series of generally vertically moving paddle members are above and below each other at another location to facilitate stripping said articles from said paddle members to form a stack of articles, said stripper comprising:

front and rear rows of laterally spaced apart upright stripper bars and carrier bars extending horizontally from one row toward the other to form a yoke, said carrier and stripper bars being spaced from each other to define slots of sufficient width between them for said vertically moving paddle members to pass through so a series of articles can be accumulated on paddle members above said carrier bars, a fixed horizontal table top adjacent the line of movement of said paddle members, said top having slots directed toward the line of vertical movement of said paddle members, said slots in the table top being aligned with said carrier and stripper bars, yoke positioning means coupled to said yoke and operative to establish said yoke in a first position in alignment with said generally vertically moving paddle members to accumulate said series of articles between said upright stripper bars while simultaneously holding said yoke at a level wherein said carrier bars are higher than said horizontal table top, said positioning means operating further to shift said yoke laterally toward a second position for said upright bars to strip said articles from said paddle members and locate the stack of articles, while being supported on said carrier bars, over said slots in the table and said positioning means operating further to lower said yoke to a third position horizontally wherein said carrier bars are registered in said plate slots flush with said table.

2. The apparatus according to claim 1 wherein said positioning means is further operative to lower said yoke by a substantial distance to a fourth position after expiration of time delay during which time said carrier bars remain in slots, then to shift said yoke laterally to a fifth position and then to elevate said yoke back to said first position.

3. The apparatus according to claim 1 including shuttle means comprising a pusher member, means for advancing said pusher means through the space between said upright stripper bars to displace the article stack when said yoke is in said third position in which said carrier bars are registered in said slots in the plate and then to retract said pusher member.

4. The apparatus according to claim 1 wherein said yoke positioning means comprises:

a carriage, a stationary horizontal work cylinder having a piston rod connected to said carriage and arranged to move said carriage bidirectionally in a horizontal plane, and a vertical work cylinder mounted to said carriage and having a piston rod connected to said base of the yoke and arranged to move said yoke in vertical planes bidirectionally.

5. The combination of an article stacker and a stripper yoke, said stacker including power driven closed loop conveyor chains having upward and downward runs, paddle members having corresponding ends connected to said chains, said paddle members being spaced equidistant from each other over the lengths of said conveyor chain loops and said members being comprised of laterally spaced apart fingers which project substantially horizontally where the chains are on said vertical run, means for feeding articles onto said paddle members such that articles constituting the desired number in a stack will become superimposed where said paddle fingers become horizontal on said vertical run, said stripper yoke comprising:

front and rear rows of parallel vertically extending bars and carrier bars projecting horizontally from said rear row toward said front row of vertical bars, all of said bars being spaced apart laterally to allow said horizontally projecting fingers of successive downwardly moving paddle members to pass between said bars so that the articles accumulate between said rear and front rows of bars when said stripper yoke is in home position and the lowermost article in the number composing a stack is intercepted by said horizontal carrier bars, a shuttle table located adjacent the path of downward movement of said paddle members, said table having slots aligned with the bars of said stripper yoke, yoke positioning means coupled to said yoke for first locating said yoke in home position wherein said carrier bars are at a level higher than the top of said shuttle table while fingers carrying the members of a stack of articles are projecting across the space between said rows of bars, secondly, to shift said yoke in a direction away from said conveyor chains for said bars to enter said slots in the table while said yoke and its carrier bars remain at their home position level, thirdly to lower said yoke a sufficient step for said carrier bars to become flush with the top of said table and to dwell in this position until said stack carrier by said carrier bars is pushed from between said front and rear rows of vertical bars, and fourthly, fifthly and sixthly respectively to lower said yoke after said dwell ends, and next shift said yoke back toward said chains and then lift said yoke back into home position.

6. A yoke for stripping a stack of pads from a stacking machine, said stacking machine comprising a conveyor member having an elongated generally downwardly moving part, a series of paddle members having corresponding ends connected to said conveyor member, said paddle members being spaced apart along said conveyor member and extending in the same direction away from said conveyor member, means for depositing pads on said paddle members, respectively, before downward movement of said paddle members occurs so that when the paddle members are moving downwardly said pads are supported one above the other to form a stack, said yoke comprising:

a laterally extending support member, a row of laterally spaced apart vertically upward projecting bars mounted to said support member, pad carrier bars projecting horizontally from said vertically upward projecting bars in the same horizontal plane, said paddle members extending between said upward projecting bars when said stack is formed, at least one of said horizontally projecting carrier bars having a vertical stack stabilizing bar projecting upwardly from it at an end remote from a vertically extending bar in said row from which said one carrier bar projects and, means for pushing said yoke in a direction for said row of vertically upward projecting bars to sweep said pads from paddle members.

* * * * *

UNITED STATES PATENT AND TRADEMARK OFFICE
CERTIFICATE OF CORRECTION

PATENT NO.  : 4,802,570
DATED       : February 7, 1989
INVENTOR(S) : John L. Hirsch et al.

It is certified that error appears in the above—identified patent and that said Letters Patent is hereby corrected as shown below:

Column 7, Line 67        Before "time" insert --- a ---

Column 8, Line  5        After "pusher" delete "means" and substitute --- member ---

Column 8, Line 61        Delete "carrier" and substitute --- carried ---

Signed and Sealed this

Eleventh Day of July, 1989

Attest:

DONALD J. QUIGG

*Attesting Officer*        *Commissioner of Patents and Trademarks*